F. PANSE.
UNIVERSAL JOINT COUPLING.
APPLICATION FILED JUNE 27, 1907.
924,187.
Patented June 8, 1909.
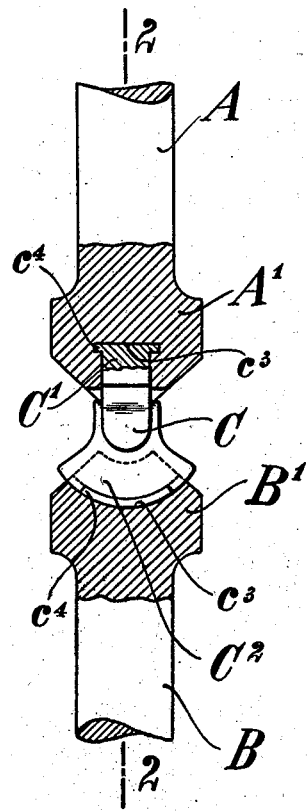
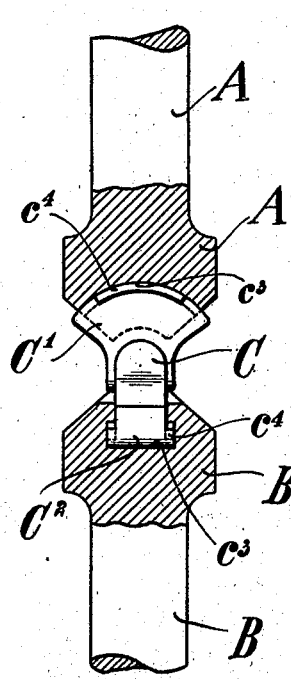
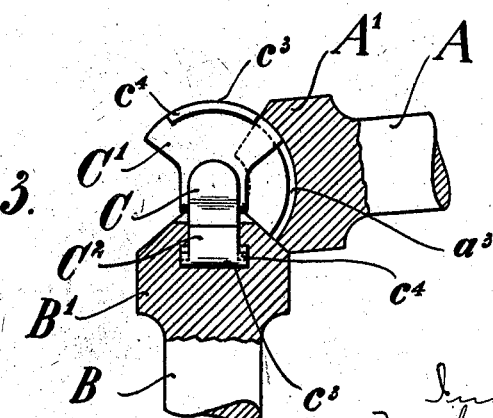

UNITED STATES PATENT OFFICE.

FRIEDRICH PANSE, OF ESSEN-ON-THE-RUHR, GERMANY, ASSIGNOR TO FRIED. KRUPP AKTIENGESELLSCHAFT, OF ESSEN-ON-THE-RUHR, GERMANY.

UNIVERSAL-JOINT COUPLING.

No. 924,187.     Specification of Letters Patent.     Patented June 8, 1909.

Application filed June 27, 1907. Serial No. 381,166.

*To all whom it may concern:*

Be it known that I, FRIEDRICH PANSE, a subject of the Emperor of Germany, and a resident of 43$^b$ Heinickestrasse, Essen-on-the-Ruhr, Germany, have invented certain new and useful Improvements in Universal-Joint Couplings, of which the following is a specification.

The present invention relates to a universal joint coupling which is very simple, is of compact form and is capable of great resistance.

One embodiment of the invention is shown in the accompanying drawing by way of example.

Figure 1 is a side view of the coupling, partly in section; Fig. 2 is a section on line 2—2, Fig. 1, looking from the left, some parts being shown in elevation; Fig. 3 is a view corresponding to that shown in Fig. 2, the parts being shown in a different position; Figs. 4, 5 and 6 are detail views, the details being shown in the view and position shown in Fig. 1.

A and B are the two shafts which are to be coupled together and which are provided with heads A' and B'. A coupling member C serves to connect the two shafts and consists of two wings C' and C$^2$ which are rigidly connected one with the other and each of which forms the sector-shaped portion of a rotary member with plane side faces. The cylindrical guide surfaces $c^3$ of the wings extend over a central angle of about 120° and belong to cylinders which have their axes intersecting in a point and at right angles to each other. The guide surfaces are arranged in such a manner that one of them is located entirely to one side and the other entirely to the other side of the plane containing the two axes of the cylinders. The sides of the wings C' and C$^2$ are provided with arcuate guide rails $c^4$ which are of rectangular cross section and which are curved in an arc coaxial with the guide surfaces $c^3$. The heads A' and B' of the two shafts are provided with recesses which have the circumferences of their walls corresponding to those of the wings C' and C$^2$ to form cylindrical guiding surfaces. In these recesses the wings C' and C$^2$ are swingingly guided. The recesses in the heads A' and B' are provided with arcuate grooves $a^3$ and $b^3$ (Figs. 4 and 6) which correspond to the rails $c^4$. When the wings engage the heads, the grooves and the rails prevent the shafts A and B from becoming separated from the coupling member C by forces exerting a pull in the direction of the axes of the shafts. The arrangement is selected in such a manner that the axes of the rotary members, of which the recesses $a^2$ $a^3$ and $b^2$ $b^3$ form a part, intersect the axes of the shafts A and B at right angles, and the central angle determined by the recesses is smaller than 180°. The size of the central angle determined by the rails $c^4$ is selected in such a manner that the rails $c^4$ are not any longer in effective engagement with the corresponding grooves $a^3$ in the shaft head A' when the shaft A is turned from the position in which the axes of the two shafts are in alinement about the coupling member C (assumed to be stationary) and the other shaft B (also assumed to be stationary) until the head A' abuts against the head B' of the other shaft (Fig. 3). The same result is obtained when the shaft B is turned about the coupling member C and shaft A. By reason of this arrangement it will be understood that the coupling can be easily disconnected and connected.

Particular attention is drawn to the fact that no bolts or screws are necessary for connecting the parts of the coupling and that the coupling can be coupled and uncoupled without the use of tools of any kind. Furthermore it is apparent that all the parts can be constructed in very strong and compact forms without giving the coupling too great dimensions.

It is not necessary that the axes of the rotary members, to which the guide surfaces $c^3$ $c^4$ on the wings C' and C$^2$ belong, intersect each other in a point; they may, of course, be spaced from each other if only their directions are at right angles to each other. It is evident that the guide surfaces $c^3$ $c^4$ may be replaced by any other suitable rotary bodies having faces which serve as guide surfaces.

Having thus described the invention, what is claimed and desired to secure by Letters Patent, is:

1. The combination of a pair of shafts having undercut recesses therein, and a coupling member swingingly mounted in said shafts, the guiding surfaces of the coupling member being laterally enlarged at their peripheries and fitting in said recesses whereby the cross sections of the recesses in the shafts and of the guiding surfaces on the coupling member interlock to prevent the shafts being separated from the coupling member when in their working positions.

2. The combination of a pair of shafts having undercut recesses therein, and a coupling member swingingly mounted in said shafts, the guiding surfaces of the coupling member being laterally enlarged at their peripheries and fitting in said recesses whereby the cross sections of the recesses in the shafts and of the guiding surfaces on the coupling member interlock to prevent the shafts being separated from the coupling member when in their working positions, the length of the interlocking positions of the guiding surfaces of the coupling member being such that at least one of the shafts can be separated from the coupling member by turning the shaft about the axis of its guiding surface on the coupling member.

3. The combination of a pair of shafts having undercut recesses therein the central angle of each of which does not exceed 180°, and a coupling member swingingly mounted in said shafts, the guiding surfaces of the coupling member being laterally enlarged at their peripheries and fitting in said recesses whereby the cross sections of the recesses in the shaft and of the guiding surfaces on the coupling member interlock to prevent the shafts being separated from the coupling member when in their working positions.

4. The combination of a pair of shafts having undercut recesses therein, and a coupling member swingingly mounted in said shafts, the guiding surfaces of the coupling member being laterally enlarged at their peripheries and having their axes at right angles and intersecting, the guiding surfaces on the coupling member fitting in the recesses in the shaft whereby the cross-sections of the recesses and the guiding surfaces interlock to prevent the shafts being separated from the coupling member when in their working positions.

5. The combination of a coupling member composed of a pair of sector shaped wings arranged at right angles to each other, arcuate guide rails arranged on the sides of the wings, and a pair of shafts recessed to fit the wings and its rails and movable to positions beyond the ends of the rails to permit them to be separated from the coupling member.

6. The combination of a coupling member composed of a pair of sector shaped wings arranged at right angles to each other, guide members arranged on the sides of the wings, and a pair of shafts recessed to fit the wings and its guide members and movable to positions beyond the ends of the guide members to permit them to be separated from the coupling member.

The foregoing specification signed at Dusseldorf, Germany, this 27th day of May, 1907.

FRIEDRICH PANSE.

In presence of—
ALFRED POHLMEYER,
M. ENGELS.